May 22, 1956 R. WEISS 2,746,368
RANGE FINDER FOR PHOTOGRAPHIC CAMERAS
Filed June 2, 1953 2 Sheets-Sheet 1

Richard Weiss
Inventor
By Charles Shepard
Attorney

May 22, 1956        R. WEISS        2,746,368
RANGE FINDER FOR PHOTOGRAPHIC CAMERAS

Filed June 2, 1953        2 Sheets-Sheet 2

Richard Weiss
Inventor
By Charles Shepard
Attorney

United States Patent Office 2,746,368
Patented May 22, 1956

2,746,368

RANGE FINDER FOR PHOTOGRAPHIC CAMERAS

Richard Weiss, Braunschweig, Germany, assignor to Franke & Heidecke, Fabrik Photographischer Prazisions-Apparate, Braunschweig, Germany, a firm of Germany Application June 2, 1953, Serial No. 362,034

7 Claims. (Cl. 95—44)

This invention relates to a range finder for photographic cameras, and more especially to a range finder which is preferably in the form of an attachment which may be readily applied to or removed from a camera.

An object of the invention is the provision of a generally improved and more satisfactory range finder.

Another object of the invention is the provision of a range finder of simple and inexpensive form, mounted in proximity to a direct view finder, so that both the range finder and the direct view finder may be used simultaneously without shifting the eye of the observer.

Still another object is the provision of a range finder in the form of a simple attachment which may easily be attached to and removed from a camera.

A further object is the provision of a range finder attachment especially adapted for use in front of the focusing hood of a camera of the twin lens reflex type.

These and other desirable objects may be attained in the manner disclosed as an illustrative embodiment of the invention in the following description and in the accompanying drawings forming part hereof, in which.

The same reference numerals throughout the several views indicate the same parts.

Figure 1:
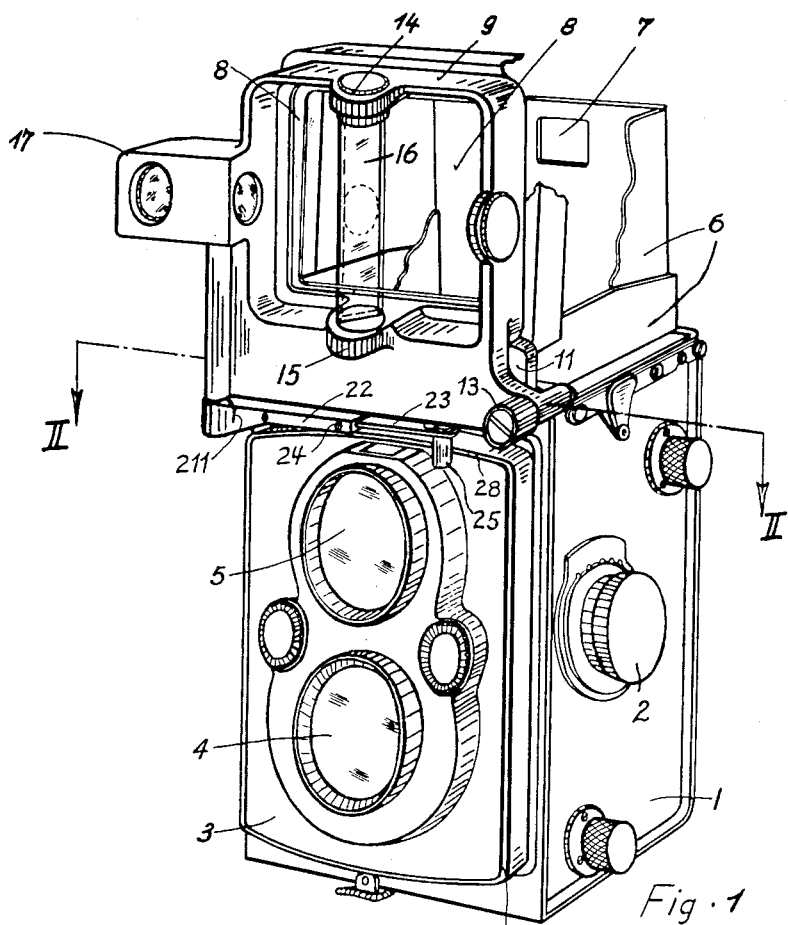
Fig. 1 is a perspective view of a camera equipped wtih a range finder attachment according to one embodiment of the present invention.

The range finder of the present invention is particularly but not exclusively adapted for use as an attachment for photographic cameras of the twin lens reflex type. In such cameras, the camera body or casing 1 is usually provided with a movable front plate or wall 3, which may also be designated as a lens board or lens support, moved backwardly and forwardly by means of a focusing knob 2. This front plate 3 carries a picture taking lens 4, for projecting light into the exposure chamber of the camera, and above this a finder lens 5, for projecting light into the reflex focusing chamber which is arranged in the camera body above the exposure chamber. The top wall of the focusing chamber is usually formed by a screen (such as ground glass, for example) on which the image produced by the focusing lens 5 is observed.

Above the ground glass screen is a foldable focusing hood indicated in general at 6, for shading the focusing screen so that the finder image thereon may be more readily and clearly observed. The camera is usually used at chest lever or waist level, with the operator looking downwardly into the open top of the focusing hood. However, for certain types of photographs it is desired to use the camera at eye level. Consequently the rear wall of the focusing hood 6 is provided with an aperture 7 which may be placed in front of the operator's eye, and the front wall 8 of the hood is provided with a hinged panel which, when opened, furnishes a large aperture in this front wall, so that the aperture 7 in the rear wall together with the aperture in the front wall form a direct view finder which may be used at eye level.

When the camera is used at waist level or chest level, with the operator looking downwardly into the top of the focusing hood, focusing is accomplished by turning the focusing knob 2 until the image on the focusing screen is sharpest. But when the direct view finder is used at eye level, the focusing screen is ordinarily not seen, and for that reason it is difficult to focus the camera. It has been proposed, for example, to overcome this by using a mirror within the focusing hood, so placed that when the operator looks at the mirror, either through the viewing aperture 7 or through a supplementary viewing aperture below the aperture 7, he will see in the mirror a reflection of a portion of the focusing screen and thus will be able still to use the knob 2 for focusing the camera until the image on the screen is sharpest. But for interior exposures, or for exposures with flashlight or other artificial light the available illumination at the moment of focusing is usually not of sufficient brightness to enable accurate focusing by observation of the sharpness of the image on the focusing screen.

Figure 2:
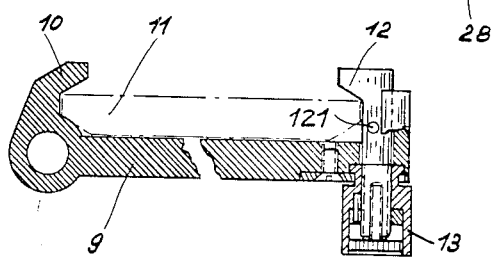
Fig. 2 is a fragmentary horizontal section taken substantially on the line 2—2 of Fig. 1.

To overcome these difficulties, the present invention provides a simple and inexpensive attachment which may be placed on the camera in front of the focusing hood, and which constitutes a range finder to be used simultaneously with the direct view finder, in order that the focusing may be accomplished independently of the brightness of the image on the focusing screen. To this end, there is provided a supplementary frame 9 readily attachable to and detachable from the camera in front of the focusing hood. For example, one side of the supplementary frame 9 may be provided, near the bottom of the frame, with a hook-shaped projection 10 which engages over one lateral edge of an upstanding plate 11 forming a fixed part of the camera body, and the other side of the frame 9 is provided near its bottom with a rotary spring bolt having a hook-like extension 12 turned by a knob 13 accessible at the front. When the bolt 12 is pushed rearwardly against the tension of its spring to release its radial pin 121 from a longitudinal locking groove in the bolt bearing and then turned through 90 degrees or more from the position shown in Fig. 2, the hook 12 is released from the plate 11 and the entire frame 9 may be taken off of the fixed plate 11 on the camera body.

The frame 9 extends approximately around the perimeter of the viewing opening in the front wall 8 of the focusing hood, leaving this viewing opening substantially unobstructed. At the top and bottom of the supplementary frame, centrally thereof, are forwardly projecting bosses 14 and 15 in which is mounted a vertical glass rod 16 of the parallel plane type acting as a beam splitter.

A hollow lateral extension 17 on one side of the frame 9 constitutes a housing containing the optical prism or reflecting element 18 together with the pivoted optical wedge 19 mounted on an oscillatable arm 20 carried on a vertical shaft 21 rotatable in suitable bearings in the frame 9. The lower end of the shaft 21 carries an arm 22 in which is telescopically arranged another arm 23 held in adjusted position relative to the main arm portion 22 by suitable holding means such as set screws 24. The outer end of the arm 23 carries a roller 25, the stub shaft of which is mounted for limited radial adjustment in a slot 26 in the arm 23 and is secured in any desired position of adjustment by tightening the nut 27 which holds the stub shaft, while still permitting the roller 25 to turn on its stub shaft.

The roller 25 is so positioned that it lies immediately in front of the upper edge 28 of the movable front wall or lens support 3 of the camera. A suitable spring 211 associated with the shaft 21 constantly tends with light pressure to swing the arm 22 rearwardly so as to hold the roller 25 lightly engaged with the lens support 3. As the lens support 3 is moved forwardly (by turning the focusing knob 2) to focus the camera upon a closer object, this swings the arms 22, 23 forwardly, turning the shaft 21 and thus moving the position of the optical wedge 19. When the motion of the focusing knob moves the lens board 3 rearwardly to focus upon a more distant object, the arms 22, 23 swing rearwardly (under the influence of the spring 211) and the optical wedge 19 is again moved.

Figure 3:
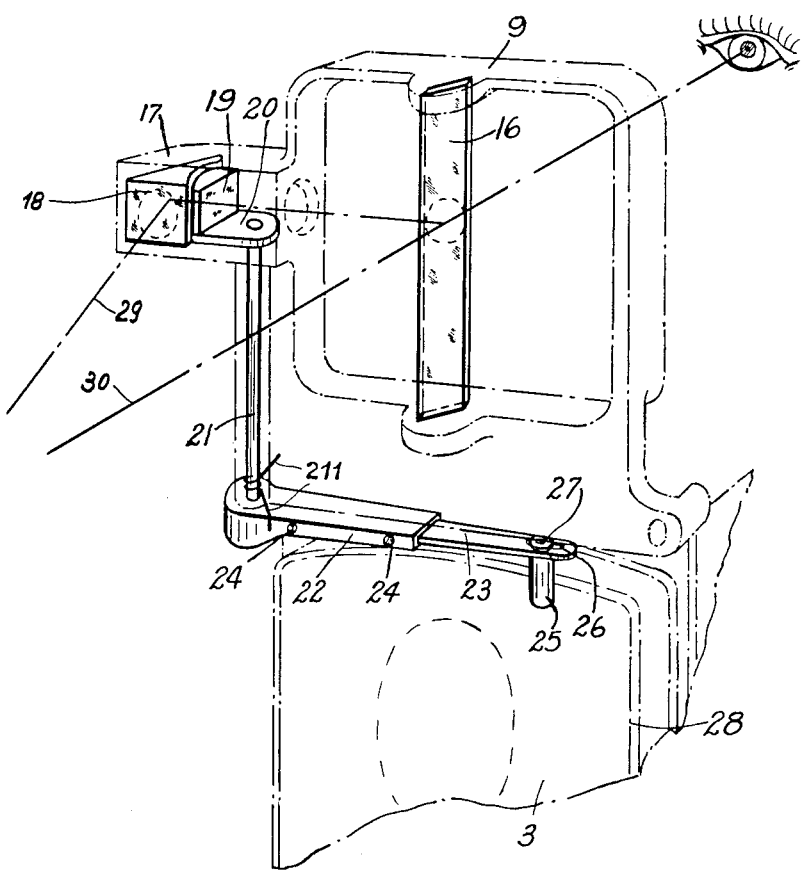
Fig. 3 is a perspective view of the essential optical elements of the mechanism shown in Fig. 1.

When the camera equipped with this attachment is placed at eye level and the observer's eye is placed in line with and closely behind the aperture 7 in the rear wall of the focusing hood 6, the observer looks forwardly through the aperture 7 and through the front opening of the hood, these parts constituting a direct view finder. At the same time, the range finder is observable by the photographer, without shifting his eye. The direct axial ray of light from the object being focused upon, passes along the line indicated at 30 in Fig. 3, through the beam splitter 16, and to the eye of the observer. Another ray of light from the same object passes obliquely along the line indicated at 29 to the prism 18, which reflects the ray laterally through the optical wedge 19 and to the beam splitter 16, which again reflects it rearwardly to the eye of the observer. Thus the observer, looking toward the beam splitter 16, sees two images of the object focused upon, one of which images is formed by the axial ray and the other of which is formed by the oblique ray through the prism 18 and the optical wedge 19. The observer can then manipulate the focusing knob 2 of the camera, to shift the camera front or lens board 3 forwardly or backwardly until the two images of the object focused upon are correctly superimposed on each other, whereupon the observer knows that the camera is correctly focused upon the object whose two images are correctly superimposed by the range finder. In initially adapting the attachment to any particular camera, the roller 25 is adjusted to the proper radial distance from the shaft 21 in accordance with the focal length of the camera lens, so that the deflection of the optical wedge 19 will be properly correlated with the forward and rearward focusing movements of the lens support 3.

While the observer is holding the camera at eye level and using the range finder, he can at the same time, and without shifting his eye, take full advantage of the direct view finder in determining the size of the field of view of the camera and ascertaining whether any particular part of the scene will be properly placed within the field of view. Thus the camera can be adequately focused even in a dim light, since the brightness and sharpness of the image on the ground glass screen are not relied upon for focusing. But if it is desired at any time to hold the camera at chest level or waist level and use the focusing screen for focusing in the normal manner, this can be done without interference of any kind from the range finder. Also, by releasing the retaining bolt 12, the range finder attachment can be instantly taken off of the camera, and can be instantly applied to the camera again whenever desired.

In the preferred form of the invention as above disclosed, the range finder has an unsymmetrical or non-symmetrical base. The principles of the invention can, of course, be adapted to a range finder of the symmetrical base type, if desired.

The camera with which the preferred form of the invention is used may be constructed in any suitable known manner, such as the camera available on the market under the trade-mark "Rolleiflex," manufactured by Franke & Heidecke, of Braunschweig, Germany. One possible form of focusing hood forming part of such a camera is disclosed, for example, in the United States patent application of Hermann Bretthauer, Serial Number 209,970, filed February 8, 1951, now Patent No. 2,641,955.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a body, a lens support mounted for forward and backward movement relative to said body for focusing, a photographic lens and a finder lens mounted on said support for bodily movement therewith, a focusing hood at the top of said body, said hood having a rear wall and a front wall both having sight apertures therein, the two apertures together constituting a direct view finder, a plate mounted on said camera body in front of said hood and having two upstanding lateral edges, a range finder frame detachably mounted on said body and having a fixed hook-like portion engaging one of said lateral edges of said plate and a movable hook-like portion engaging the other of said lateral edges to retain said frame on said camera body, said frame having a hollow portion in front of and approximately encircling the outline of the sight aperture in the front wall of said focusing hood, a hollow lateral extension on said frame, a light beam splitter comprising a plane parallel glass rod mounted in said frame and extending approximately centrally across the outline of said sight aperture in the front wall of said focusing hood, a light reflecting element mounted in said hollow lateral extension in position to receive light from an object on which the camera is focused and deflect it laterally toward said beam splitter, a shaft rotatably mounted on said frame, a light deflecting element operatively connected to said shaft to be rotated thereby, said light deflecting element being in the path of light rays passing from said reflecting element to said beam splitter, an operating arm mounted on said shaft, and a contact element mounted on said operating arm and contacting with said lens support to be moved by focusing movement of said lens support so that focusing movement of said lens support will move said operating arm and turn said shaft to vary the position of said deflecting element relative to a beam of light passing from said reflecting element to said beam splitter.

2. A construction as defined in claim 1, in which said operating arm is in two parts slidable radially with respect to each other to vary the effective length of the arm.

3. A construction as defined in claim 1, in which said contact element is in the form of a roller adjustably mounted on said operating arm for radial movement relative thereto.

4. A construction as defined in claim 1, further including a spring operatively connected to said operating arm and tending to keep said contact element constantly engaged with said lens support.

5. A range finder attachment for a camera body of the type including a forwardly and rearwardly movable lens support at the front of the body, an upstanding plate having two exposed lateral edges near the top of the body, and a direct view finder on the top of the body, said range finder attachment including an apertured frame, clamping means on said frame for engaging said lateral edges of said plate to hold said frame in upstanding relation to said camera body with the aperture of said frame alined with said direct view finder and with said frame at least partially encircling the field of view of said direct view finder, a beam splitter mounted in said frame and extending across the aperture thereof and across the field of view of the direct view finder, said beam splitter being formed to receive light rays approaching from the front and also rays approaching laterally and to pass such rays rearwardly to the eye of an observer looking through said direct view finder, optical deflecting means mounted on said frame laterally of the field of view of the direct view finder and formed to receive light rays approaching from the front and to deflect such rays laterally toward said beam splitter, said deflecting means including a movable deflecting element, a shaft rotatably mounted in said frame and operatively connected to said movable deflecting element to move the same upon movement of said shaft, and a feeler arm mounted on said shaft for engaging said movable lens support to move said shaft from the focusing movement of said lens support and thereby move said deflecting element.

6. A construction as defined in claim 5, in which said clamping means includes a fixed hook-like member for engaging one lateral edge of said plate, and a rotatable latching member having a hook-like extension thereon for engaging another lateral edge of said plate.

7. A range finder attachment for detachable use on a camera of the type having a body, a focusing hood at the top of the body provided with two sight openings together forming a direct view finder, and a lens carrier mounted at the front of said body below said hood for forward and backward movement for focusing purposes, said range finder attachment comprising a range finder frame, means for detachably securing said frame to said camera body above said lens carrier and in front of said hood, said frame being apertured for passage of light through said direct view finder in substantially non-obstructing relation thereto, a relatively narrow elongated beam splitter mounted on said frame and extending across the aperture thereof in one direction and widely spaced from the edges of the aperture in a second direction at right angles to the length of said beam splitter, a reflecting element mounted on said frame in a position substantially spaced from said beam splitter in said second direction and located beyond the outline of said aperture in non-obstructing relation to the field of view of said direct view finder, said reflecting element being positioned to reflect light approaching from an object in front of said camera toward said beam splitter, a light deflecting member adjustably mounted on said frame adjacent said reflecting element, and a movable arm mounted on said frame and operatively connected to said deflecting member to move the same and having a portion engaging said lens carrier when said frame is secured in normal position on said camera body, to move said deflecting member in accordance with focusing movement of said lens carrier.

References Cited in the file of this patent

UNITED STATES PATENTS

| 2,127,925 | Leitz | Aug. 23, 1938 |
| 2,165,402 | Mihalyi | July 11, 1939 |
| 2,180,013 | Mihalyi | Nov. 14, 1939 |
| 2,190,559 | Drenko | Feb. 13, 1940 |
| 2,245,158 | Philips et al. | June 10, 1941 |
| 2,472,732 | Stillwell | June 7, 1949 |

FOREIGN PATENTS

| 590,770 | Germany | Jan. 9, 1934 |